(12) United States Patent
Agarwal et al.

(10) Patent No.: US 8,046,220 B2
(45) Date of Patent: Oct. 25, 2011

(54) SYSTEMS AND METHODS TO INDEX AND SEARCH VOICE SITES

(75) Inventors: Sheetal K. Agarwal, Pune (IN); Dipanjan Chakraborty, Kolkata (IN); Arun Kumar, Noida (IN); Sougata Mukherjea, New Delhi (IN); Amit Anil Nanavati, New Delhi (IN); Nitendra Rajput, New Delhi (IN)

(73) Assignee: Nuance Communications, Inc., Burlington, MA (US)

( * ) Notice: Subject to any disclaimer, the term of this patent is extended or adjusted under 35 U.S.C. 154(b) by 988 days.

(21) Appl. No.: 11/946,122

(22) Filed: Nov. 28, 2007

(65) Prior Publication Data

US 2009/0138262 A1   May 28, 2009

(51) Int. Cl.
*G10L 15/26* (2006.01)

(52) U.S. Cl. .................... 704/235; 379/88.17
(58) Field of Classification Search ............ 704/235; 379/88.17

See application file for complete search history.

(56) References Cited

U.S. PATENT DOCUMENTS

| | | | |
|---|---|---|---|
| 7,024,364 B2 * | 4/2006 | Guerra et al. | 704/270 |
| 7,027,987 B1 | 4/2006 | Franz et al. | |
| 7,072,328 B2 | 7/2006 | Shen et al. | |
| 7,548,915 B2 * | 6/2009 | Ramer et al. | 705/14.54 |
| 7,698,131 B2 * | 4/2010 | Bennett | 704/215 |
| 7,725,320 B2 * | 5/2010 | Bennett | 704/255 |
| 7,725,321 B2 * | 5/2010 | Bennett | 704/257 |
| 7,729,909 B2 * | 6/2010 | Rigazio et al. | 704/233 |
| 7,831,426 B2 * | 11/2010 | Bennett | 704/252 |
| 7,860,706 B2 * | 12/2010 | Abir | 704/4 |
| 7,890,957 B2 * | 2/2011 | Campbell | 719/313 |
| 7,933,389 B2 | 4/2011 | Kumar et al. | |
| 2001/0056479 A1 | 12/2001 | Miyayama et al. | |
| 2002/0069059 A1 | 6/2002 | Smith | |
| 2002/0095472 A1 | 7/2002 | Berkowitz et al. | |

OTHER PUBLICATIONS

Kumar, Arun et al., WWTW: The World Wide Telecom Web, ACM SIGCOMM Workshop on Networked Systems for Developing Regions, Aug. 27, 2007, Kyoto Japan.
Google set to woo non-Internet users with voice search, Mar. 24, 2004, retrieved Oct. 16, 2007 from Internet <URL:http://news.zdnet.co.uk/internet/0,1000000097,39149846,00.htm>.
Fishman, Eric. "Search Voice Users Archive", Jul. 11, 1998, 16:47:42, retrieved Oct. 16, 2007 from Internet <URL:http://www.voicerecognition.com/voice-users/archive/1998/3935.html.
S.E. Johnson et al., "A Method for Direct Audio Search with Applications to Indexing and Retrieval", Proc. of IEEE ICASSP, 2000, pp. 1427-1430.
L.S. Kennedy et al., "Automatic Discovery of Query-Class-Dependent Models for Multimodal Search", ACM International Conference on Multimedia, 2005, pp. 882-891.

* cited by examiner

*Primary Examiner* — Susan McFadden
(74) *Attorney, Agent, or Firm* — Wolf, Greenfield & Sacks, P.C.

(57) ABSTRACT

A method includes crawling and indexing voice sites and storing results in an index; receiving a search request in voice from a user via a telephone; performing speech recognition on the voice search request and converting the request from voice to text; parsing the query; and performing a search on the index and ranking the search results. Search results may be filtered based on attributes such as location and context. Filtered search results may be presented to the user in categories to enable easy voice browsing of the search results by the user. Computer program code and systems are also provided.

20 Claims, 6 Drawing Sheets

```
<vxml version="1.0">
<var name="ibm_confirm_form_id"/>
<form id="welcome">        ← 60
    <field name="currency">    ← 66
        <grammer src="http://localhost:8080/currency/names.grxml/"/>
        <prompt bargein="false">
            Welcome to the currency rates voice site.
            We can provide you the exchange rate for any major currency. The rates are almost real-time.    ← 62
            What currency are you interested in?
        </prompt>
    </block>
    <catch event="help">    ← 64
        <prompt bargein="false">
            <audio src="http://cc.ibm.net/prompts/help_general.wav"/>
        </prompt>
        <goto next="#welcome"/>
    </catch>
    <block>       ← 68
        <var name="JServSessionIdroot"/>
        <assign name="JServSessionIdroot" expr="'rlbgjulu5l'"/>
        <submit expr="'/cc/app/StartModel/Start/l'" method="get" namelist="JServSessionIdroot"/>
    </field>
</form>
</vxml>
```

SYSTEMS AND METHODS TO INDEX AND SEARCH VOICE SITES

TECHNICAL FIELD

Some embodiments of the invention relate to voice user interfaces, automatic speech recognition, text to speech synthesis, and voice sites. Various embodiments of the invention relate to searching. Some embodiments relate to crawling and indexing.

BACKGROUND

Voice Extensible Markup Language (VoiceXML) is a markup language for creating voice user interfaces that use automatic speech recognition and text-to-speech synthesis and is described, for example, at http://www.voicexml.org, http://www.vxml.org, http://www.w3.org/TR/voicexml20/ and elsewhere. VoiceXML has tags that instruct the voice browser to provide speech synthesis, automatic speech recognition, dialog management, and audio playback.

Proposals, such as Google VoiceSearch, exist for searching conventional web sites through voice.

SUMMARY

Various aspects provide a system comprising a server configured to crawl and index respective voice sites, the server including a CTI adapter to call up voice sites and a network adapter configured to connect to and communicate with a server that has voice site code and exports it through an API; the server being further configured to receive connections from respective telephones and to process requests from users of the telephones for respective searches of the voice sites.

Some aspects provide a method comprising: crawling and indexing voice sites and storing results in an index; receiving a search request from a user via a telephone or http request; performing speech recognition on the search request and converting the request from voice to text; parsing the query; performing a search on the index and ranking the search results; presenting relevant search results to the user such that the user can audibly hear the results over the telephone.

Other aspects provide a memory bearing computer program code that, when loaded into a computer, causes the computer to crawl and index voice sites and store results in an index; receive a search request from a user via a telephone; perform speech recognition on the search request and convert the request from voice to text; parse the query; perform a search on the index and ranking the search results; and present relevant search results to the user such that the user can audibly hear the results over the telephone.

Some aspects provide a method comprising crawling and indexing voice sites and storing results in an index; receiving a search request in voice from a user via a telephone; performing speech recognition on the voice search request and converting the request from voice to text; parsing the query; performing a search on the index and ranking the search results; filtering search results based on at least one of location, emotion, and context; and presenting the filtered search results to the user in categories to enable easy voice browsing of the search results by the user.

Some aspects provide systems and methods for searching voice sites that are arranged in a web, the method comprising using at least one of meta information, prompts, structure, and audio contained in the voice sites.

Some aspects provide a system comprising circuitry configured to crawl voice sites; circuitry configured to index voice sites and store results in an index; circuitry configured to receive a search request in voice from a user via a telephone; a speech to text generator configured to perform speech recognition on the voice search request and convert the request from voice to text; a parser configured to parse the query; circuitry configured to perform a search on the index and rank the search results; circuitry configured to filter the search results based on at least one of location, emotion, and context; and a voice interface configured to present the filtered search results to the user.

BRIEF DESCRIPTION OF THE VIEWS OF THE DRAWINGS

FIG. 4 illustrates an example of VXML code contained in a voice site of the type illustrated in FIGS. 1 and 2.

DETAILED DESCRIPTION OF THE ILLUSTRATED EMBODIMENTS

Figure 1:
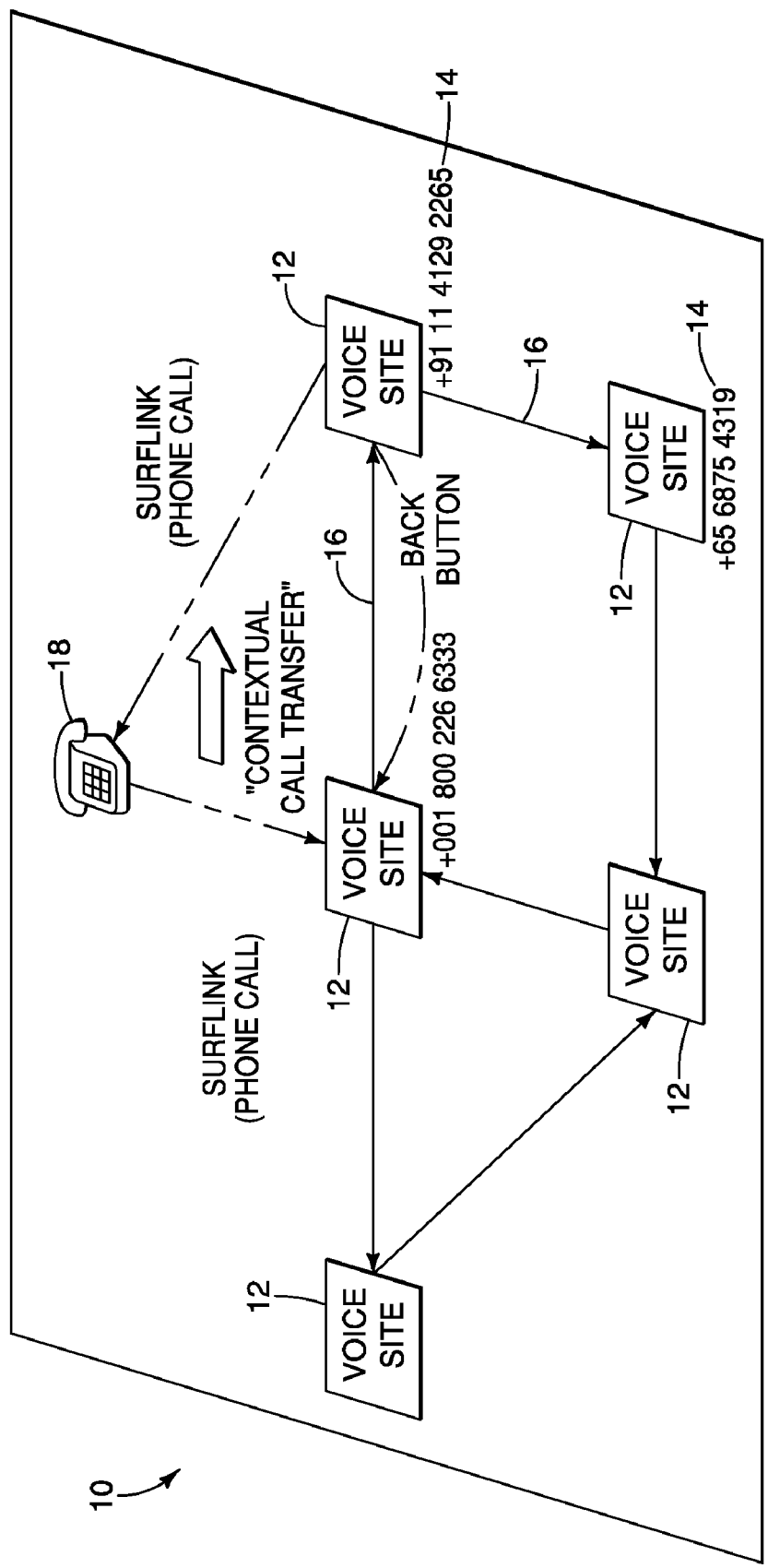
FIG. 1 is a block diagram illustrating a web of voice sites.

FIG. 1 shows a WorldWide TelecomWeb (WWTW) 10. The WWTW 10 is a space for information and services in which the items of interest, referred to as voice sites 12, are identified by global identifiers called VoiNumbers 14 and maybe interconnected through links that we refer to as VoiLinks 16. A VoiNumber is a virtual phone number that either maps onto a physical phone number or to other uniform resource identifiers such as a SIP Uniform Resource Identifier (URI). A SIP URI is the SIP addressing schema to call another person via the Session Initiation Protocol (SIP). In other words, a SIP URI is a user's SIP phone number.

The term "voice site" refers to a voice driven application that consists of one or more voice pages (e.g. VoiceXML files) that are hosted on servers or computers in the telecom infrastructure. Voice sites 12 are accessed by calling up the associated VoiNumber through a telephony interface and interacting with its underlying application flow.

The term "VoiLink" refers to a link 16 from one voice site 12 to another through which a caller interacting with the source voice site can be transferred to the target voice site 12 in the context of the voice site application.

As shown in FIG. 1, the WWTW 10 comprises a web of interconnected voice sites 12 each of which includes a voice driven application. In some embodiments, a voice site 12 can be created through a simple voice driven interface over a phone call from a phone 18. Therefore, individual subscribers can easily offer their own voice-based applications without the need for a computer. In some embodiments, one or more voice sites 12 are augmented to connect to services in the converged network such as Web Services available in the IT infrastructure and services in the 3G/IMS infrastructure.

Applications for the WWTW 10 can include, for example, voice kiosks, tele-banking, tele-shopping, appointment scheduling, tech support, order inquiry, package tracking, driving directions, emergency notification, wake-up, flight tracking, voice access to email, customer relationship management, prescription refilling, audio newsmagazines, real estate information, directory assistance applications and other applications that are presently available on the World Wide Web. Attention is directed to commonly assigned U.S. patent application Ser. No. 11/612,787, filed Dec. 19, 2006, titled "System and Method for Generating Voice Sites," and incorporated herein by reference.

Proposals, such as Google VoiceSearch, exist for searching conventional web sites through voice. This is not the same as searching voice sites. Due to the unique structure of voice sites, specialized search techniques can be developed for searching the WWTW. What is needed, and what is described herein, is a system and method for searching of voice sites.

Figure 2:
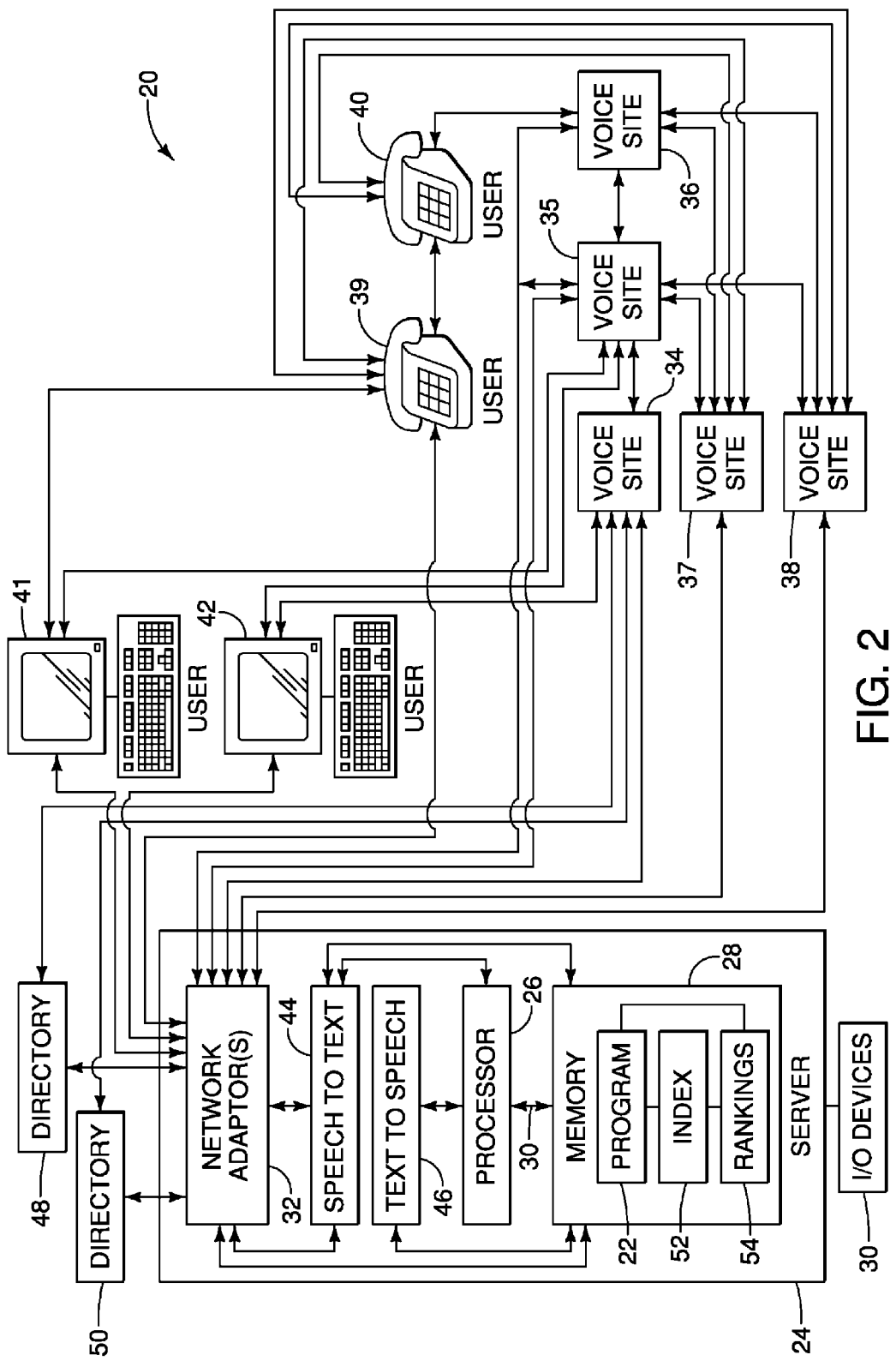
FIG. 2 is a block diagram illustrating a system for crawling and indexing voice sites, and for searching and using voice sites, in accordance with some embodiments.

FIG. 2 shows a system 20 in accordance with various embodiments. Various aspects of the invention take the form of an entirely hardware embodiment, an entirely software embodiment or an embodiment containing both hardware and software elements. In some embodiments, the invention is implemented in software, which includes but is not limited to firmware, resident software, microcode, etc.

Furthermore, aspects of the invention can comprise a computer program product 22 accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system 24 suitable for storing and/or executing program code 22 will include at least one processor 26 coupled directly or indirectly to memory elements 28 through a system bus 30. The memory elements 28 can include local memory employed during actual execution of the program code, bulk storage, and cache memories which provide temporary storage of at least some program code in order to reduce the number of times code must be retrieved from bulk storage during execution. In some embodiments, the data processing system 24 is defined by a server or computer, or multiple servers or computers.

Input/output or I/O devices 30 (including but not limited to keyboards, displays, pointing devices, etc.) can be coupled to the data processing system 24 either directly or through intervening I/O controllers.

One or more network adapters 32 may also be included in the server 24 to enable the server 24 to become coupled to other data processing systems or remote printers or storage devices through intervening private or public networks. Modems, dialers, cable modems, telephony modems, and Ethernet cards are just a few of the currently available types of network adapters.

More particularly, in the illustrated embodiment, the network adapter 32 is a Computer Telephony Integration (CTI) card. The server 24 is configured to call voice sites 34-38 using the CTI card.

The server 24 uses text prompts, audio prompts, expected voice site user response through speech recognition grammars, and meta information available in the presentation layer (e.g., at the VoiceXML level for VXML sites) to index crawled voice sites.

While only a few voice sites 34-38 are illustrated in FIG. 2, the number of voice sites is not restricted by the system and voice sites can be distributed across organizations and geographic locations. Similarly, while only one server 24 is illustrated, in some embodiments there will be multiple cooperating servers 24. In the illustrated embodiments, at least some of the voice sites 34-38 are arranged in a web, with certain prompts resulting in a transfer of a user from one voice site to another as illustrated in FIG. 1. Multiple voice sites 34-38 could be hosted by a single server, in some embodiments.

The network adapter or adapters 32 is/are configured to connect to and communicate with the voice sites 34-38. The server 24 is further configured to receive connections from respective users, via telephones 39-40 and to process requests from the users (via the telephones 39-40) for respective searches of the voice sites 34-38.

The results of a search are communicated from the server 24 to the telephone 39 or 40 by voice or to a web browser of a computer 41 or 42 through text. More particularly, in the illustrated embodiment, the data processing system or server 24 includes a text to speech generator 46 in the illustrated embodiment. In the illustrated embodiment, the server 24 further includes a speech to text (or voice to text) generator 44. The speech to text generator 44 converts speech from voice sites to text for processing by the processor 26, for example during crawling and indexing of the voice sites 34-38 (e.g., if code cannot be extracted). In other words, the speech to text generator 44 performs speech recognition. The text-to-speech generator 46 and the speech to text generator 44 may be defined, for example, by a Computer Telephony Integration card, a single common sound card, by multiple sound cards, by a single sound chip (integrated circuit), or by multiple sound integrated circuits, either included in or external of the server 24.

In some embodiments, the crawling may start from a single or multiple directory sites 48 and 50. The directory sites 48 and 50 are data processing systems, separate from the server 24, and include lists of voice sites. The directory sites 48 and 50 may be maintained by third parties such as telephone companies or other directory services (similar to Yellow Pages). In other embodiments, some or all directories are maintained in the server 24. After the crawling, results are indexed and stored in an index 52 in the server 24 or elsewhere. Voice sites may be ranked, as will be described below, and rankings 54 can be stored in the server 24 or elsewhere.

In the illustrated embodiment, the users 39 and 40 may communicate directly with voice sites or with each other.

In some embodiments, some users may use personal computers or other data processing systems 41 and 42, instead of telephones, to request searches of voice sites 34-38 or to communicate with voice sites.

Figure 3:
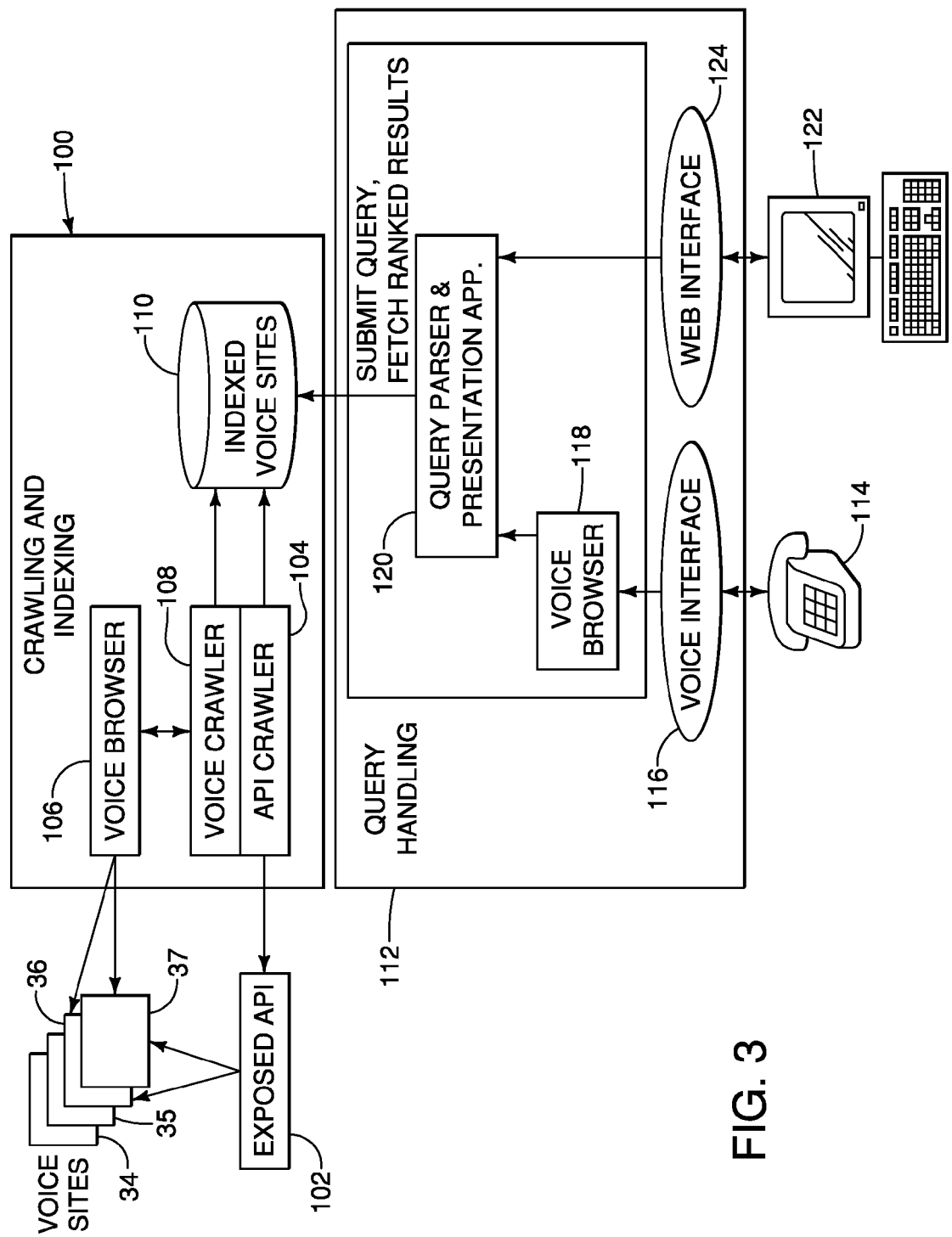
FIG. 3 is a block diagram illustrating a system and method for crawling and indexing for sites, in accordance with other embodiments.

FIG. 3 shows a system 98 in accordance with alternative embodiments.

Crawling and indexing 100 is performed on voice sites 34, 35, 36, 37 in two different manners. When an exposed API 102 is available, voice crawler 108 causes API crawler 104 to be used, and the results are stored in an index 110. If no API is available for a voice site, voice crawler 108 causes voice browser 106 to be used and the results are stored in the index 110. Multiple separate indexes may be used in alternative embodiments.

In query handling 112, a request for a search is received by a user using a phone 114, who interacts through a voice interface 116 with a voice browser 118. The voice browser 118 causes a query parser and presentation application 120 to submit a query to the index 110 and fetch results. The results are ranked, in some embodiments. The results are presented to the user via the voice browser 118 through the voice interface 116.

A request for a search may also be received by a user using a computer 122 that has a web interface 124. The web interface 124 causes the query parser and presentation application 120 to submit a query to the index 110 and fetch results. The results are ranked, in some embodiments. The results are presented to the user via the web interface 124.

In FIG. 3, various functions are performed on multiple separate machines (e.g., on multiple separate computers or servers). For example, at least some crawling and indexing 100 is performed by a different computer or server than the text to speech or speech to text conversions, or the query parsing. For example, in some embodiments, the crawling and indexing 100 is at least partially performed by a first server or computer, the query parser and presentation application 120 is defined by a second server or computer, and the voice browser 118 and voice interface 116 are defined by a third server or computer, and the voice sites are defined by one or more additional servers or computers. In other words, the various functions can be distributed over a number of servers or computers. Some functions may run in parallel on multiple computers or servers.

In some embodiments, the computers or servers in the embodiment of FIG. 3 include the relevant components of the server 24 of FIG. 3.

FIG. 4 illustrates an example of VXML code contained in a voice site of the type illustrated in FIGS. 1 and 2. Items that can be crawled and later searched include, for example, one or more of grammar 60, text prompts 62, audio prompts 64, and meta information such as 66 and 68.

In some embodiments, the server 24 obtains source code from the API of a voice site during crawling. In the World Wide Web, the source of a web site is typically available through the Browser's menu options (for instance, menu options View, Source in Internet Explorer). However, in the case of voice sites 34-38, the mode of interaction is not through the Internet but through a telephonic conversation. Therefore, in some embodiments, crawling comprises obtaining access to the voice source code from APIs exposed by a voice site owner.

Grammar 60 in VXML captures possible voice responses that users can say in response to voice prompts to make selections. Voice site logic will proceed based on the selection made. When a query is made, the search can be made on the grammar of voice sites to answer the query.

Text prompts 62 refer to text that a voice site converts from text to speech for the user. Audio prompts 64 refer to prerecorded voice, such as prerecorded human voice clips in audio format. Meta information includes information about the voice site that is typically not heard by a user of a voice site. In FIG. 4, meta information includes form ID information and a catch event, for example. Other types of meta information can include creator profile, date of creation, location of deployment, etc. Different voice sites may have different types of meta information available.

In some embodiments, when source code is not available, the server 24 performs automated agent-based speech crawling. Compared to the source code based crawling option described above, this option becomes necessary when the source code of a voice site is not exposed by the voice site owner. In such a case, crawling comprises using an automated agent that acts as a user and interacts with the voice site or sites to be crawled. This involves, for example, listening to and parsing the prompts and voice messages played by the voice site, and also responding to those prompts for carrying on a valid voice based interaction. As a result of different such valid interactions, the crawling comprises determining the content and structure of the voice site. For example, the server 24 connects to voice sites, converts audio to text for processing or provides prerecorded audio clips (e.g., .wav files), and tries various options of various menus. In some embodiments, a template of standardized likely responses expected by the voice site is used by the server to attempt to provide response to voice prompts from a voice site. Further audio from the voice site may provide clues as to what sort of responses the voice site is expecting.

Figure 5:
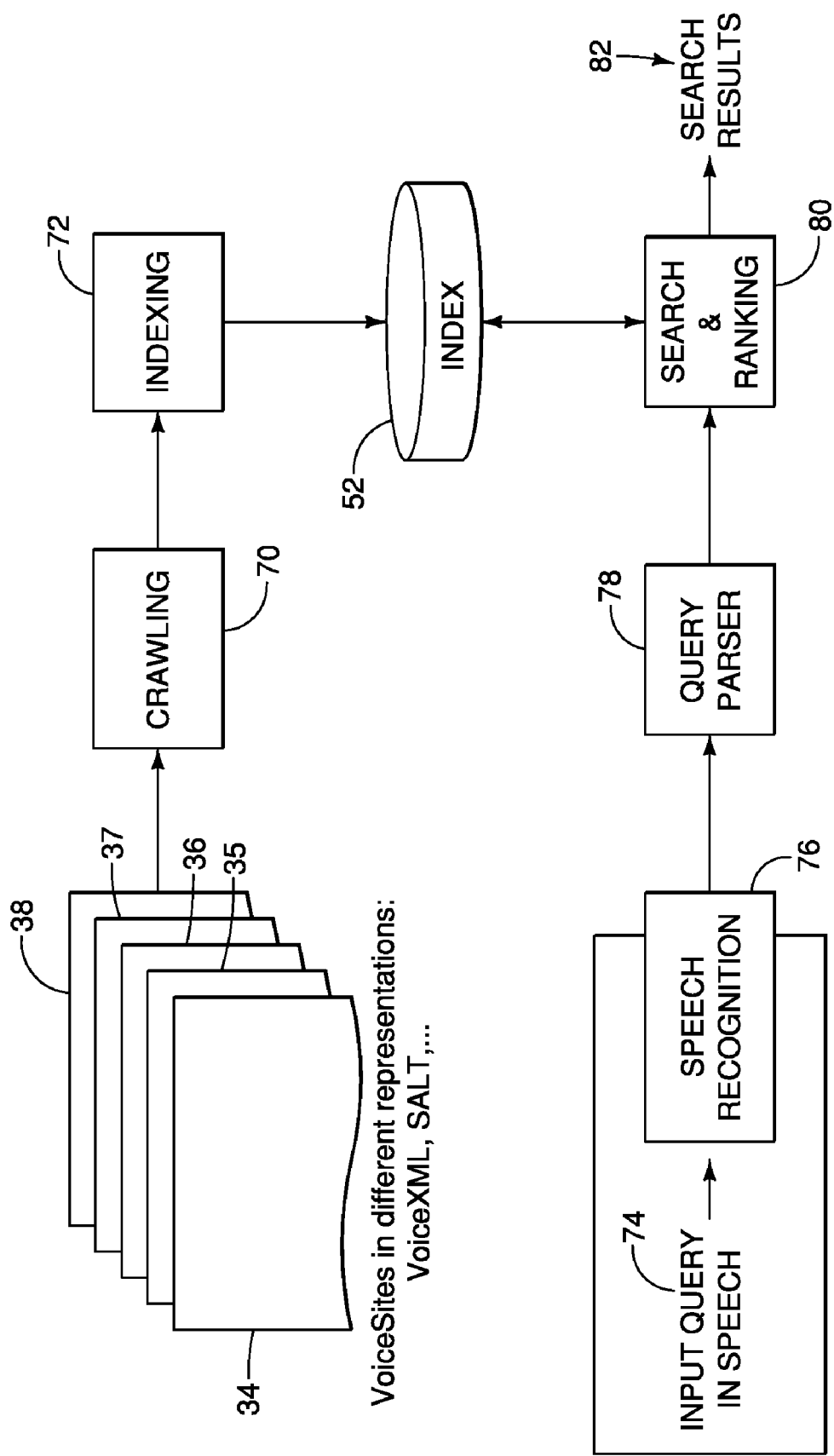
FIG. 5 is a process flow diagram illustrating crawling, indexing, and processing of search requests, in some embodiments.

FIG. 5 is a process flow diagram illustrating crawling, indexing, and processing of search requests by the server 24, in some embodiments.

Voice sites 34-38 may be in different representations such as VXML, SALT, or other similar formats. These sites are crawled 70, indexed 72, and results are stored in an index 52 (see also FIG. 2) or multiple indices, all by the server 24. When a user using a telephone 39 or 40, or computer 41 or 42 (see FIG. 2) requests a search, their query is input 74, speech is recognized 76 (e.g., by speech to text generator 44 of FIG. 2), the query is parsed 78, the search is performed 80 (and results are ranked), and search results are provided 82 to the user (e.g., using the text to speech generator 46).

Figure 6:
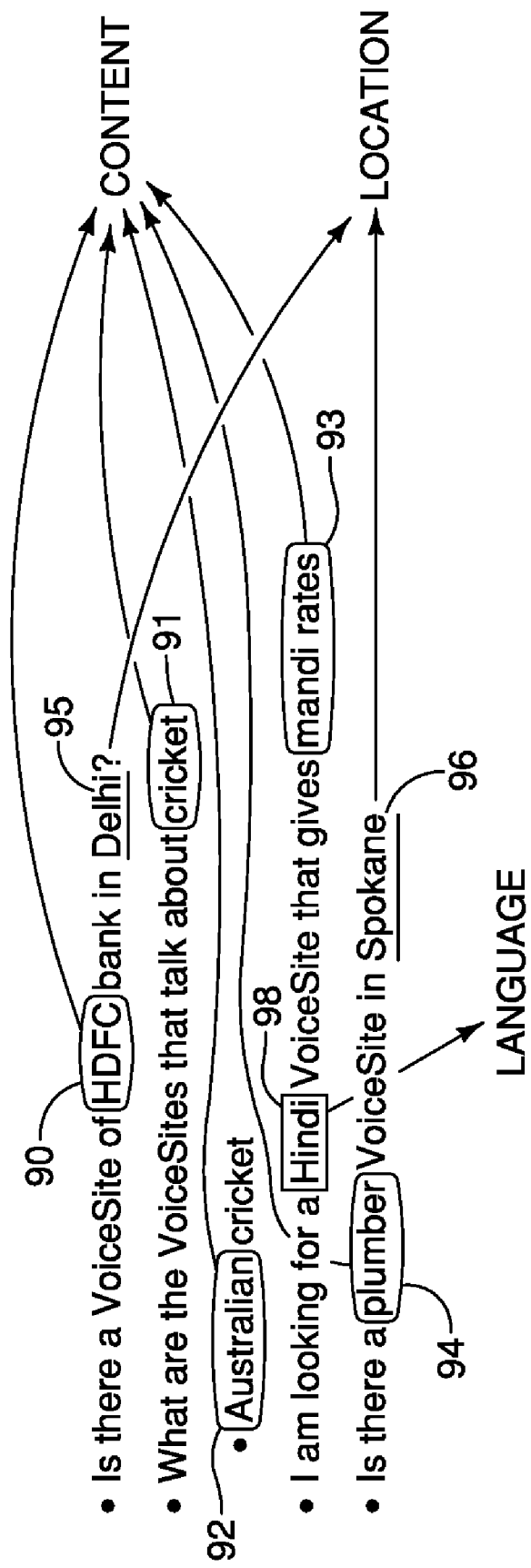
FIG. 6 illustrates parsing of search requests.

FIG. 6 illustrates parsing of a search request that can be performed by the server 24 (e.g., after voice is converted to text). In some embodiments, a query is parsed to identify one or more of a desired location, content, language, and emotion. In other embodiments, alternative or additional items may be determined during processing. A query is then generated for searching the index 52. The example of FIG. 6 shows queries including content terms 90-94, location terms 95 and 96, and a language term 98.

In some embodiments, indexing is based on one or more of content, language, location, meta information, and emotion.

Content that may be indexed is primarily identified through prompts (text and audio). An example of content is weather, banking, trains, or similar content words.

Language of interaction may be specified in meta information of VXML. Language may be more important for phone users than computer users because the users will want to communicate in their own language.

Location of a telephone user is readily available. Indexing by location allows identification of sites that are more relevant to a user based on the user's proximity to the sites. Location of a VXML site can be extracted from the grammar. For example, grammar may indicate U.S. states, states in India, or other location information.

Meta information that will be indexed may include, for example, back end services, databases, or other voice sites to which this voice site links. Meta information that will be indexed may also include the profile of the voice site owner. Meta information that will be indexed may also include terms indicating the lifecycle of the voice site, such as creation date and time, and modification date and time.

Indexing may also be performed based on emotion. Different audio prompts can convey different human emotions.

Ranking may be based on one or more of popularity based on inlinks to the site, popularity based on hits (calls to the site), XML tags, and frequency of a search keyword. Rankings may be based on multiple dimensions. For example, ranking may be based on popularity determined by number of inlinks to a sight (page rank). Ranking may be based on popularity determined by hits (calls) to a sight. It may be possible to obtain this information from telephone companies. Ranking may also be based on XML tags or the frequency of a search keyword in the site.

In compliance with the patent statutes, fairly specific embodiments, including preferred embodiments, have been described. It is to be understood, however, that the patent protection sought is not to be limited to the specific embodiments shown and described. The protection sought is to be limited only by the following claims, which are to be afforded full scope, and to be appropriately interpreted in accordance with the doctrine of equivalents. It should be readily apparent that the improvements claimed herein provide more than predictable use of prior art elements according to their established functions.

We claim:

1. A system comprising:
   circuitry configured to crawl voice sites;
   circuitry configured to index voice sites and store results in a voice site index, wherein each voice site comprises a voice driven application that includes one or more voice pages hosted on servers or computers in a telecom infrastructure;
   circuitry configured to receive a search request in voice from a user via a telephone;
   a speech to text generator configured to perform speech recognition on the voice search request and convert the request from voice to text;
   a parser configured to parse the text search request;
   circuitry configured to perform, in response to the parsed search request, a search on the voice site index and rank the search results;
   circuitry configured to filter the search results based on at least one of location, emotion and context; and
   a voice interface configured to present the filtered search results to the user.

2. A system in accordance with claim 1, wherein the voice interface provides the filtered results to the user in categories, for efficient voice browsing of the filtered search results.

3. A system in accordance with claim 1, wherein the circuitry configured to crawl is defined by a server.

4. A system in accordance with claim 3, wherein the circuitry configured to receive a search request in voice is defined by a server.

5. A system in accordance with claim 4, wherein the first mentioned server is different from the second mentioned server.

6. A system in accordance with claim 1, wherein the circuitry configured to index is defined by a server.

7. A system in accordance with claim 1, wherein the circuitry configured to index is configured to index voice sites using information contained in at least one of text prompts, audio prompts, meta information, and grammars from voice sites.

8. A system in accordance with claim 1, wherein the parser is defined by a server.

9. A system in accordance with claim 1, wherein the parser is configured to parse a search query to identify different types of terms in the query, the types including at least one of location, emotion and context, in addition to content terms.

10. A system in accordance with claim 1, wherein the circuitry configured to crawl is defined by a computer.

11. A method comprising:
    crawling and indexing voice sites and storing results in a voice site index, wherein each voice site comprises a voice driven application that includes one or more voice pages hosted on servers or computers in a telecom infrastructure;
    receiving a search request in voice from a user via a telephone;
    performing speech recognition on the voice search request and converting the request from voice to text;
    parsing the text search request;
    performing, in response to the parsed search request, a search on the voice site index and ranking the search results;
    filtering search results based on at least one of location, emotion and context; and
    presenting the filtered search results to the user in categories to enable easy voice browsing of the search results by the user.

12. A method in accordance with claim 11, further configured to receive a search request from a user via the World Wide Web.

13. A method in accordance with claim 11, wherein the crawling is performed by extracting source code through an API and comprises extracting grammar items from voice sites, wherein grammar items are possible responses to voice prompts that the voice site expects.

14. A method in accordance with claim 11, wherein the crawling comprises extracting text prompts from voice sites.

15. A method in accordance with claim 11, wherein the crawling comprises extracting audio prompts from voice sites and converting the voice to text.

16. A method in accordance with claim 11, wherein the crawling is performed by extracting source code through an API and comprises extracting meta information from voice sites.

17. A method in accordance with claim 11, wherein the parsing comprises identifying at least one of location, language, and emotion.

18. A non-transitory memory encoded with instructions that, when executed by a computer, causes the computer to:
    receive a voice search request from a user via a telephone;
    perform speech recognition on the voice search request and convert the request from voice to text;
    parse the text search request;
    perform, in response to the parsed search request, a search on an index of voice sites and rank the search results, wherein each voice site comprises a voice driven application that includes one or more voice pages hosted on servers or computers in a telecom infrastructure; and
    present at least one relevant search result to the user such that the user can audibly hear the results over the telephone.

19. A memory in accordance with claim 18, wherein the parsing comprises looking for terms indicating at least one of location, language, and emotion, in the search request.

20. A memory in accordance with claim 18, wherein presenting at least one relevant search result comprises providing search results in categories.

* * * * *